April 28, 1936.  J. F. EATON  2,038,527
POLISHED ROD SHOCK ABSORBER
Filed Dec. 3, 1935
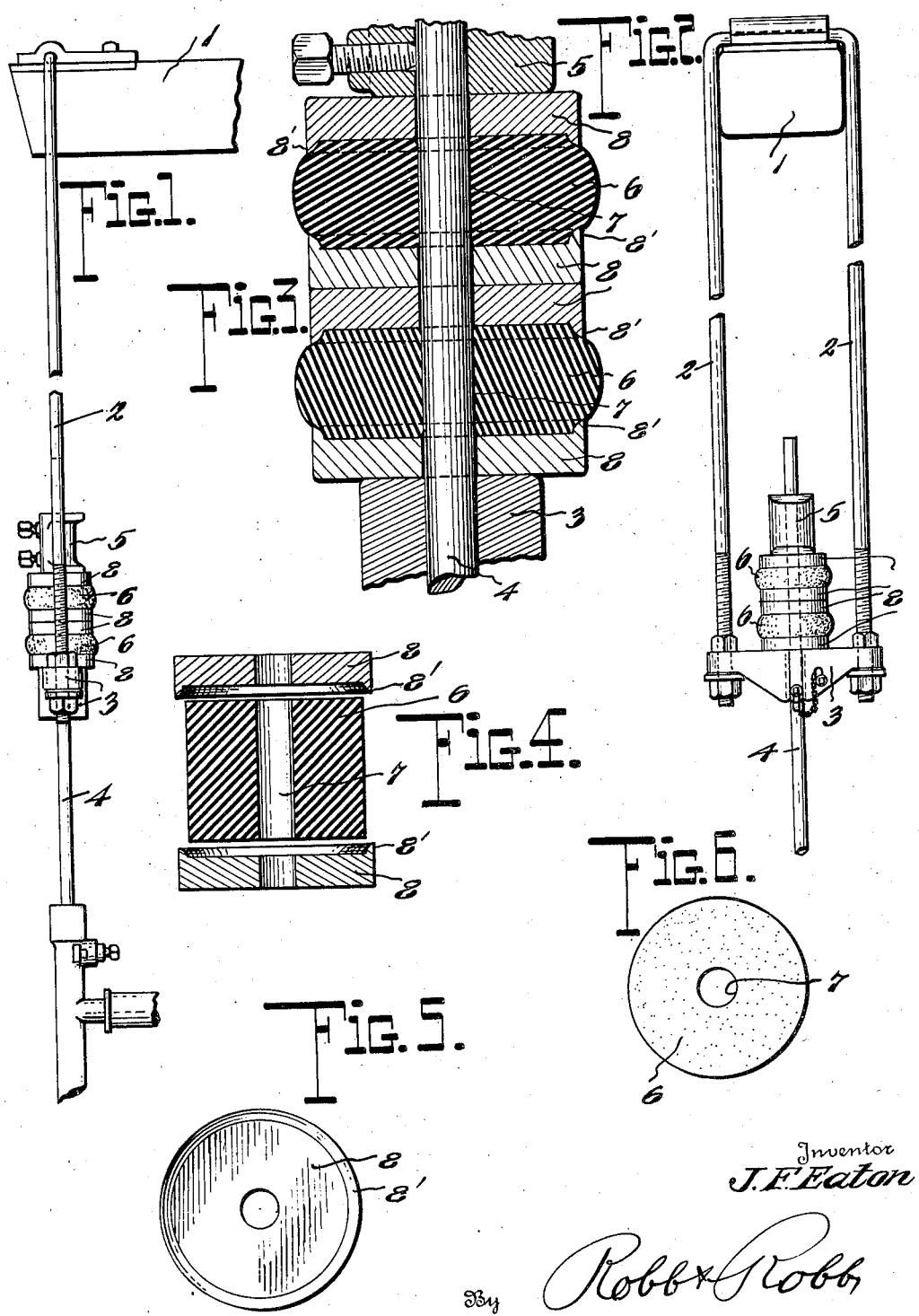
Inventor
J. F. Eaton
By Robb & Robb
Attorneys Patented Apr. 28, 1936

2,038,527

UNITED STATES PATENT OFFICE 2,038,527

POLISHED-ROD SHOCK ABSORBER

John F. Eaton, Tulsa, Okla., assignor to The Engineering Company, Tulsa, Okla.

Application December 3, 1935, Serial No. 52,734

1 Claim. (Cl. 255—16)

The present invention relates to improvements in shock absorbers for polished or sucker rods of a pumping well, and has for its primary object the provision of a simple cushioning unit capable of being easily and quickly incorporated in present standard well equipment without alteration thereof.

In carrying out the invention, I provide a unit of the type referred to composed of a cylindrical body of rubber and end retaining plates or washers between which the rubber cushion is held, such unit being installed between the beam hanger carrier bar and the polished rod clamp of a pumping well apparatus.

While the invention appears simple in construction, actual tests under practical working conditions have shown the following advantages to be derived from its combination with the hanger support of a well pump:

(a) Reduction of maximum rod load by five to fifteen per cent.

(b) Reduction in rod failures by one hundred to one thousand per cent.

(c) Insulation of rods from vibrations and shocks originating in the gas engines, gears, beam hanger linkages for straight line motion, loose bearings, etc.

(d) Absorption of stresses resulting from harmonic vibrations in sucker rods.

(e) Cushioning of impact and acceleration rod loads.

(f) Reduction of polished rod horse power without loss of production, and incident thereto the reduction of rod fatigue with an increase in pumping efficiency.

(g) Smoothing out of the small fluctuations in rod load, and elimination of the fatiguing effects produced by such fluctuations.

With these and other objects in view as will in part hereinafter become apparent and in part be stated, the invention comprises certain other novel constructions, combinations and arrangements of parts as subsequently specified and claimed.

In the accompanying drawing,—

Figure 1 is a side elevation of the end of the beam hanger with my invention in operative position thereon.

Figure 2 is a front elevation of the parts shown in Figure 1.

Figure 3 is an enlarged, fragmentary sectional view showing the shock absorber in section and under compression.

Figure 4 is a vertical sectional view of a single absorber unit assembly.

Figure 5 is a plan view of one of the end plates or washer members used with my device, and Figure 6 is a plan view of the rubber cushioning element of the absorber.

Like reference characters refer to similar parts throughout the various figures of the drawing.

Referring to the drawing, I designates the walking beam, 2 the hanger suspended therefrom, and 3 the carrier bar of said hanger. This portion of the appartus is of conventional form and construction, and connection thereof to the polished rod 4 is usually made by adjusting the polished rod clamp 5 on the top of the rod and resting against the carrier bar 3. It is quite well understood that the common usage of this equipment subjects the same to great stresses, vibration, and impact shocks which result in breakage of the rods and hangers, accompanied by accidents, delays, and heavy expense in replacement. Attempts have been made to overcome these difficulties by spring cushioning the connection, but these have been very unsatisfactory from the standpoint of economy and actual service performance. This has led me to devise a cushioning unit in which rubber cushions are employed, and usage of such units has shown a marked improvement in respect to the various phases which I have hereinbefore enumerated under the list of advantages derived from the combination of my shock absorber unit in the pumping well equipment.

Each shock absorber unit is preferably composed of a cylindrical body 6 of rubber, which may be built up into such shape on a mandrel in layers and then cut off to the proper size and form. It is to be understood, however, that it may be molded and that other shapes than cylindrical may be employed. The body 6 is provided with a bore or bores 7, preferably in the center, and at each end of said body is seated an apertured metal plate or cap 8 acting as a retainer and compressing means, said cap preferably having an annular, beveled flange 8'. The polished rod passes through the plates and rubber body, and the shock absorption property is obtained by compression of the rubber which causes it to bulge or distort outwardly while the ends are held in the recessed plates, as shown specifically in Figure 3 of the drawing.

By the use of one or more of such units, the amount of compression and the amount of motion of the polished rod with reference to the beam hanger may be regulated. It is obvious that the amplitude of compression or the distance the end plates are forced together depends upon the total well load and varies with the diameter and hardness of the rubber. The amount of compression for each shock absorber unit preferably varies from one-half inch to one inch.

In the installation of the absorber, the polished rod is clamped above the stuffing box so that the clamp on the beam hanger carrier may be displaced from the rod. The shock absorber is now slipped over the polished rod and the clamp reset above the original position a sufficient distance to accommodate for the height dimension of the particular shock absorber and to retain the original pump spacing. In Figures 1 to 3 of the drawing, I have shown the use preferably of two of these unit constructions, because such arrangement usually gives rise to from two to three times as much reduction in load as does the use of a single unit, due to the greater amplitude of motion of the polished rod in relation to the beam hanger carrier bar provided by such double unit. Of course, such provision of single or plural units enables the particular cushioning effect to be supplied according to the demands in any particular case or operation. I have found that in many cases production of the well is materially increased by the use of these shock absorbers due to the lengthening of the polished rod stroke, and by the use of the rubber cushion type it is further found that the shock absorber lasts for a considerably longer period than the spring type with the additional advantage that the rubber deadens the high frequency vibrations which occur in the pumping operations.

What I claim is:—

The combination, with a pump polished rod, a beam hanger carrier bar, and a rod clamp, of a shock absorber unit interposed between the clamp and the bar and composed of a rubber body and end plates, said plates and body having apertures through which the polished rod extends, and said plates being freely slidable on the rod to permit compression of the rubber body between the plates.

JOHN F. EATON.